United States Patent [19]

Rosenberg

[11] Patent Number: 4,704,571
[45] Date of Patent: Nov. 3, 1987

[54] ARRANGEMENT FOR RECOVERING POWER LOSS OF AN INTERNAL COMBUSTION ENGINE

[75] Inventor: Heinz Rosenberg, Wollersdorf, Austria

[73] Assignee: Siemens Aktiengesellschaft, Munich, Fed. Rep. of Germany

[21] Appl. No.: 865,098

[22] Filed: May 20, 1986

[30] Foreign Application Priority Data

Jun. 24, 1985 [DE] Fed. Rep. of Germany ....... 3522549

[51] Int. Cl.$^4$ ................ H02P 9/14; F01K 23/10; F02G 5/00
[52] U.S. Cl. ........................... 322/29; 290/52; 318/157; 322/46
[58] Field of Search ................... 322/14–16, 322/29–32, 46, 47, 78, 87; 290/1 A, 4 C, 20, 52; 60/618, 597

[56] References Cited

U.S. PATENT DOCUMENTS

| | | | |
|---|---|---|---|
| 1,673,598 | 6/1928 | Slepian | 322/78 X |
| 2,509,662 | 5/1950 | Wisman | 322/78 X |
| 2,541,820 | 2/1951 | Ker | 322/78 X |
| 3,366,869 | 1/1968 | Young | 322/46 |
| 3,512,075 | 5/1970 | Raver et al. | 322/46 X |
| 3,566,251 | 2/1971 | Hoglund | 322/46 |
| 3,758,843 | 9/1973 | Ishizaki et al. | 322/87 X |
| 4,035,713 | 7/1977 | Kawamoto et al. | 322/46 X |
| 4,134,054 | 1/1979 | Akamatsu | 318/685 |
| 4,394,582 | 7/1983 | Kreissl et al. | 290/52 X |

FOREIGN PATENT DOCUMENTS

| | | |
|---|---|---|
| 0045843 | 2/1982 | European Pat. Off. . |
| 197483 | 4/1908 | Fed. Rep. of Germany . |
| 729008 | 6/1932 | France . |
| 997986 | 1/1952 | France . |
| 1229766 | 9/1960 | France . |
| 1400187 | 4/1965 | France . |
| 358359 | 10/1931 | United Kingdom . |

Primary Examiner—R. J. Hickey
Attorney, Agent, or Firm—Kenyon & Kenyon

[57] ABSTRACT

An arrangement for recovering power loss of an internal combustion engine including a turbine, the driving power of which stems from a power loss of the internal combustion engine. The turbine is coupled to a generator, a winding of which feeds a d-c motor relieving the internal combustion engine. Power matching between the generator and the d-c motor is made possible without a separate control device because the generator or its excitation circuit is designed in such a manner that the voltage induced in the generator winding exhibits a steep dependence within a narrow operational speed range.

25 Claims, 10 Drawing Figures

ARRANGEMENT FOR RECOVERING POWER LOSS OF AN INTERNAL COMBUSTION ENGINE

BACKGROUND OF THE INVENTION

This invention relates to internal combustion engines in general and more particularly to an arrangement for recovering power loss in an internal combustion engine.

An arrangement for recovering the lost power of an internal-combustion engine, comprising a turbine, the driving power of which comes from the power loss of the internal-combustion engine and a generator coupled to the turbine, the generator having a winding, with a d-c motor coupled to the winding relieving the internal combustion engine, is described in European Patent Application No. 0 045 843 (U.S. Pat. No. 4,394,582). The optimum utilization of such an arrangement requires utilizing all of the available driving power of the turbine, i.e., always running with a fully open turbine. On the one hand, lost power and therefore also the power which can be supplied by the generator and used by the electric motor depends on the respective losses and thus, on the operating state of the internal-combustion engine, and is therefore highly variable. On the other hand, the speed of this internal-combustion engine and therefore of the electric motor relieving it can also be variable over a range determined by operating conditions. This is the case particularly in vehicle drives. The problem of utilizing a variable, given generator power with an electric motor, the speed of rotation of which is likewise variable and given, therefore, arises. In general, particularly in vehicle drives, there is no unambiguous correlation between these respectively given operating variables. In the arrangements known so far, adapting the power consumed by the electric motor to the power that can be given off by the generator requires separate controls which means considerble technical effort and financial expenditures which do not seem tolerable especially in vehicle drives operating at relatively low power as well as under large load and speed variations.

It is, thus, an object of the present invention to develop the arrangement described above in such a manner that load matching is possible without a separate control device.

SUMMARY OF THE INVENTION

According to the present invention, the stated problem can be solved by a design of the generator and its field circuit in such a way that the voltage induced in the generator winding exhibits a steep dependence in the same sense of the operating speed without a separate control device.

Such a dependence as occurs, for instance, in self-excited d-c, synchronous or asynchronous generators in the magnetically unsaturated region, is shown in FIG. 1. In the narrow speed range from the onset of self-excitation at the generator speed $n_1$ to the beginning of magnetic saturation at the generator speed $n_2$, the induced voltage increases steeply from the value $U_1$ to the many times larger value $U_2$. Therefore, self-excitation with unstable speed occurs. The same course of voltage versus speed can also be achieved by internal excitation of the generator by a self-excited exciter machine. The steep speed dependence of the generator voltage can also be achieved or can be improved additionally by means other than self or internal excitation.

The power consumed by a d-c motor increases with the voltage supplied and decreases with increasing motor speed.

If the generator is driven with a speed n in the range $n_1 \leq n \leq n_2$ and if the turbine power increases, starting from a power equilibrium, between a fully opened turbine, generator and d-c motor, the power increase first results in an acceleration torque for the turbine and the generator, the speed of which, therefore, rises. However, a small increase of the speed is sufficient to let the generator voltage increase so much that the d-c motor consumes the generator power corresponding to the increased turbine power. Thereby, the acceleration torque disappears. The speed of the turbine and the generator, therefore, no longer increases and power equilibrium is restored. If the turbine power decreases, the power matching occurs in the reverse direction through a slight decrease in speed of the turbine and generator.

If the power equilibrium is disturbed starting with the d-c motor, for instance, because the speed impressed by the internal combustion engine coupled therewith increases and therefore, the motor and thereby the generator power initially decreases, a power excess of the turbine is obtained again which accelerates the latter and the generator by a small speed increment which restores the power equilibrium through increase of the generator voltage. Vice versa, the power equilibrium is renewed by a slight speed decrease of the turbine and the generator if the speed impressed on the d-c motor is reduced.

DETAILED DESCRIPTION

Figure 1:
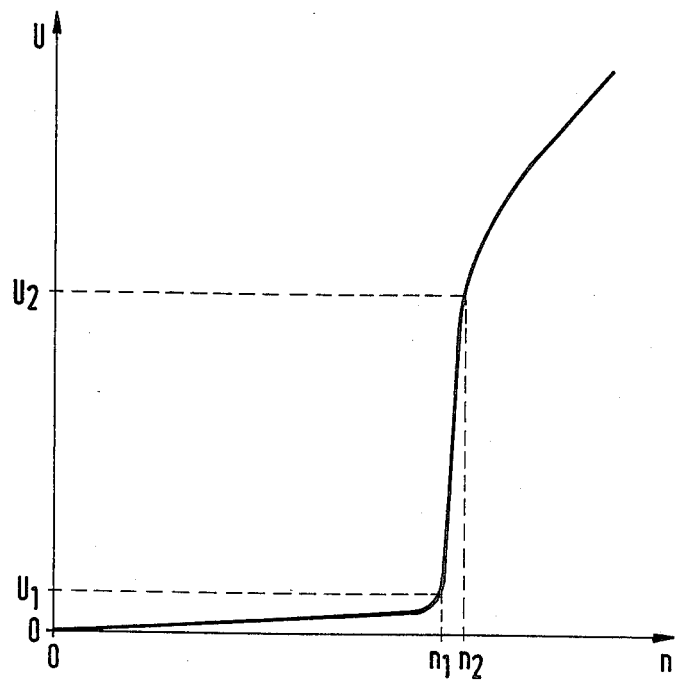
FIG. 1 is a curve illustrating the relationship between speed and voltage in self excited machines.
Figure 2:
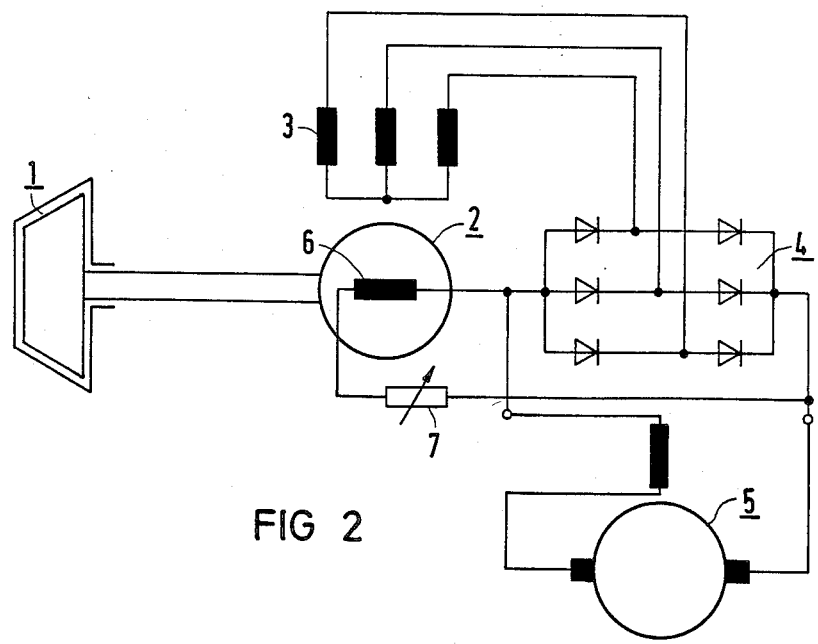
FIG. 2 illustrates a basic circuit with a self-excited synchronous generator which feeds a d-c series motor via a load rectifier.

In the embodiment according to FIG. 2, a synchronous generator 2 coupled to a turbine 1 feeds, with its induced winding 3, a d-c motor 5 designed as a series motor via a load rectifier 4. The load rectifier 4 also supplies the field winding 6 of the synchronous generator 2 via an adjustable resistor 7. This results in self-excitation with the curve of the generator voltage versus generator speed shown in FIG. 1. Through the resistor 7 the range of the generator speed n which operationally extends from $n_1$ to $n_2$ can be shifted and thereby adapted to a turbine speed which is favorable with respect to efficiency.

Figure 10:
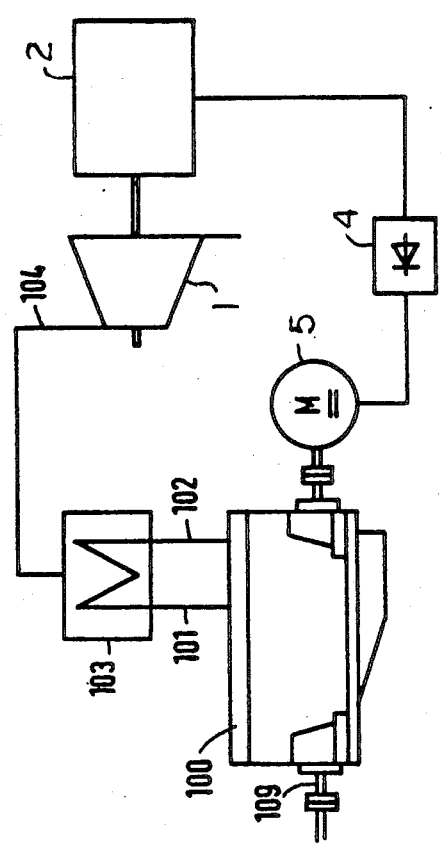
FIG. 10 is a schematic illustration of the connection of an arrangement for the recovery of the power loss of an internal combustion engine.

The synchronous generator 2 and the load rectifier 4 in FIG. 2 can also be replaced by a self-excited d-c shunt generator. However, in such a machine speed limits which prohibit a direct coupling to the turbine 1 exist, because of the commutator, where the speed must be chosen very high in view of the efficiency. Referring briefly to FIG. 10, the reference numeral 100 denotes an internal combustion engine whose energy losses during operation are to be recovered. Coolant water and any exhaust gasses of this internal combustion engine 100 are supplied via lines 101 and 102 to a steam generator 103. The steam generator 103 is connected via a steam line 104 to turbine 1 of the present arrangement. Generator 2 is coupled to the turbine 1. The d-c motor 5 of the present arrangement is connected to the generator 2 by means of a rectifier 4. The d-c motor 5 is connected by its drive shaft to the drive shaft 109 of the internal combustion engine 100 so that the d-c motor 5 supports the internal combustion engine 100 with power. In this manner, the arrangement of FIG. 2 and similarly the other embodiments discussed herein are connected to an internal combustion engine 100.

Figure 3:
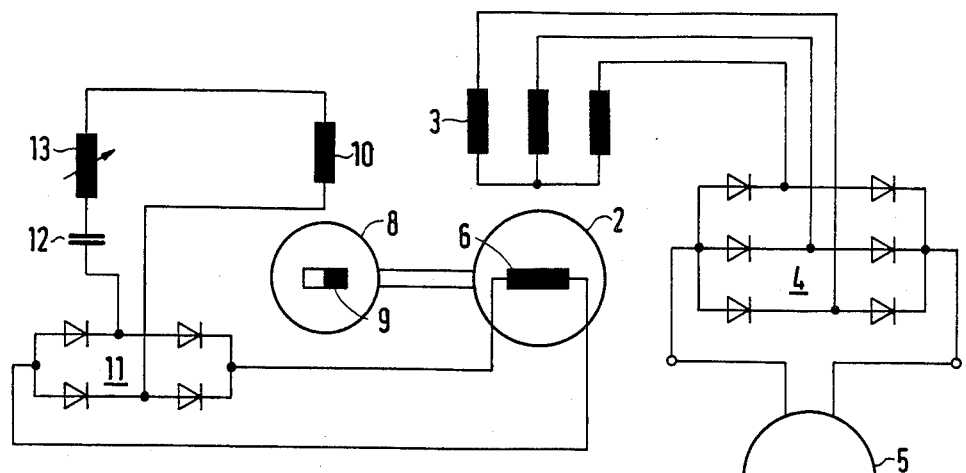
FIG. 3 illustrates a basic circuit with an internally excited (self-contained) synchronous generator which feeds a d-c motor via a load rectifier.

In the circuit according to FIG. 3, the generator 2 is likewise a synchronous generator, the induction winding 3 of which supplies a d-c motor 5 via the load rectifier 4. An exciter machine 8 is coupled to the synchronous generator 2. The working winding 10 of the exciter machine 8 supplies the field winding 6 of the synchronous generator 2 via an excitation rectifier 11. The synchronous generator 2, therefore, works with self-contained excitation. The exciter machine 8 is excited by permanent magnets 9. The voltage induced in the working winding 10, therefore, increases only proportionally to the speed and would, therefore, alone would not result in a voltage curve for the synchronous generator 2 according to FIG. 1. This characteristic curve is achieved by a resonant series circuit which is formed by the working winding 10 together with a choke 13 and a capacitor 12 and which is designed so that its resonance frequency is equal to or only slightly higher than the frequency corresponding to the upper operating speed $n_2$ (FIG. 1) of the voltage generated in the working winding 10. The resonant series circuit, therefore, provides a resistance which drops steeply with increasing speed in the operating speed range $n_1 \leq n \leq n_2$, whereby the field current and the field winding 6 of the synchronous generator 2 increases accordingly and thereby, the voltage generated by this generator also increases. The choke 13 can be designed with variable inductance so that the resonance frequency of the series resonant circuit and thereby the speed range of the generator governing the steep voltage change can be adapted to a desired turbine speed. If the adjustability of the choke 13 is dispensed with, this choke can also be omitted and the working winding 10 designed so that its inductance is sufficient to form a series resonant circuit having the required resonance frequency with the capacitor 12.

The arrangement with self-contained excitation of the synchronous generator 2 in FIG. 3, has the advantage over the arrangement according to FIG. 2 operating with self-excitation that, through appropriate design of the series resonant circuit, a curve for the field current of the synchronous generator 2 versus its speed can be obtained such that this machine can also be magnetically saturated in the upper operating voltage range, whereby its utilization is improved. A further advantage of the arrangement in accordance with FIG. 3 is obtained if the permanent magnets 9 are accommodated in the stator and the working winding 10 as well as the capacitor 12, the choke 13 and the excitation rectifier 11 are accommodated in the rotor of the exciter machine 8. The synchronous generator 2 then requires no slip rings.

The internally excited synchronous generator 2 can also be given a self-excited exciter machine (not shown in the drawing) of which the speed-unstable self excitation for the synchronous generator 2 results in a field current which causes the generator to have a curve of generator voltage as per FIG. 1.

Figure 5:
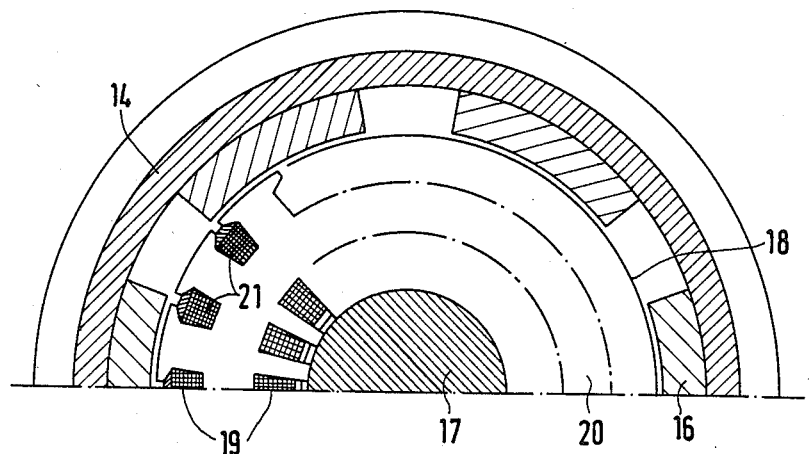
FIG. 5 is a schematic cross section of a permanent magnet-excited synchronous generator with an external rotor and a stator provided with a ring winding.
Figure 4:
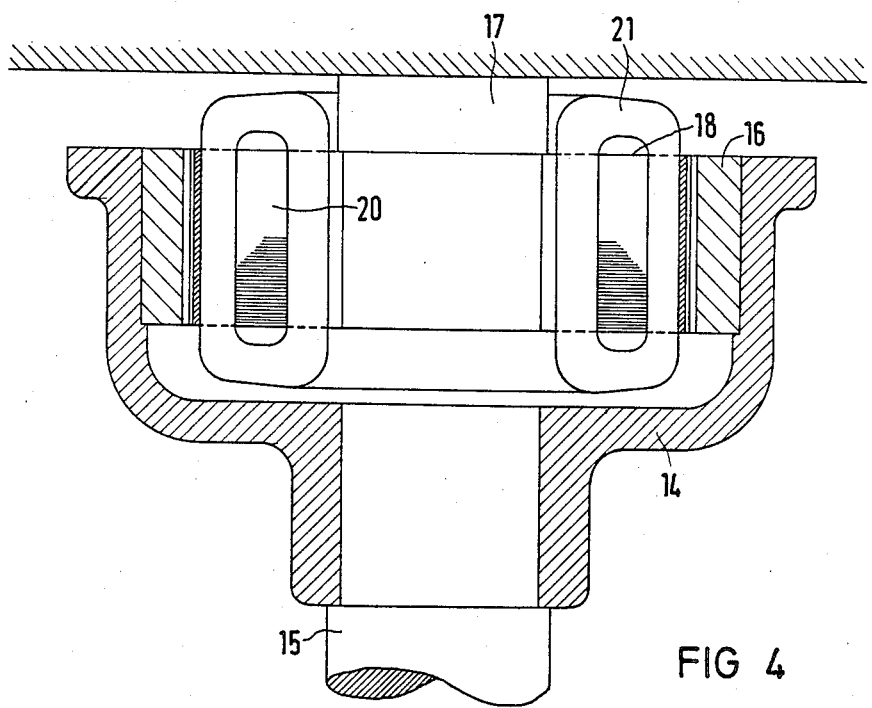
FIG. 4 is a schematic longitudinal section of a permanent magnet excited synchronous generator with an external rotor and a stator provided with a ring winding.

The generator 2 may also be a permanent magnet excited synchronous machine. If the latter is to be coupled directly to a high-speed turbine, a reluctance machine with a windingless rotor may be of interest, in which the induction winding 3 as well as the permanent magnets are arranged in the stator. Another design of the generator suitable for extremely high speeds is shown in FIGS. 4 and 5 as a 6-pole embodiment. A bell-shaped rotor body 14 of iron is arranged with overhang on a shaft 15 and carries permanent magnets 16 on its inside. The centrifugal forces of these permanent magnets 16 are taken up by the rotor body 14. The stator lamination stack 18 of the generator is mounted on an arbor 17 of non-magnetizable material and has mutually corresponding slots 19 on its outside and inside. In these slots 19, a ring winding 21 is accommodated. The small overhang of its end face connections permits a short axial overall length of the rotor body 14 even for a small number of poles, which is important for high-speed rotors arranged with overhang. The ring winding 21 can consist of two separate winding sections, where the one winding section forms the winding 3 induced by the permanent magnets 16, of the generator 3 and the other winding section, supplied with d-c current, imparts a tangential pre-magnetization to the stator yoke 20. Depending on the magnitude of the magnetic saturation of the stator yoke caused by this pre-magnetization, the fluxes of the permanent magnets 16 are weakened more or less strongly and the voltage induced in the winding 3 is thereby changed.

Through a special design and connection of the ring winding 21, the two windings mentioned above can be combined, i.e., the conductors of the ring winding 21 carry at the same time the a-c current delivered by the synchronous generator 2 and the d-c current which controls the generator voltage by the pre-magnetization of the stator yoke 20. This results in considerable saving of winding metal and/or reduction of the winding losses over separate winding sections. The arrangement and connection of such a combined ring winding 21 is shown in FIGS. 6 and 7 for a two-pole design.

Figure 6:
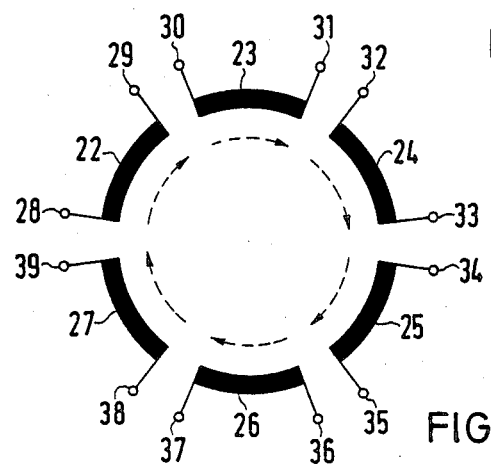
FIG. 6 is a schematic illustration of a ring winding of FIG. 4 which gives off the power of a synchronous generator as well as causes a controllable pre-magnetization of the stator yoke.
Figure 7:
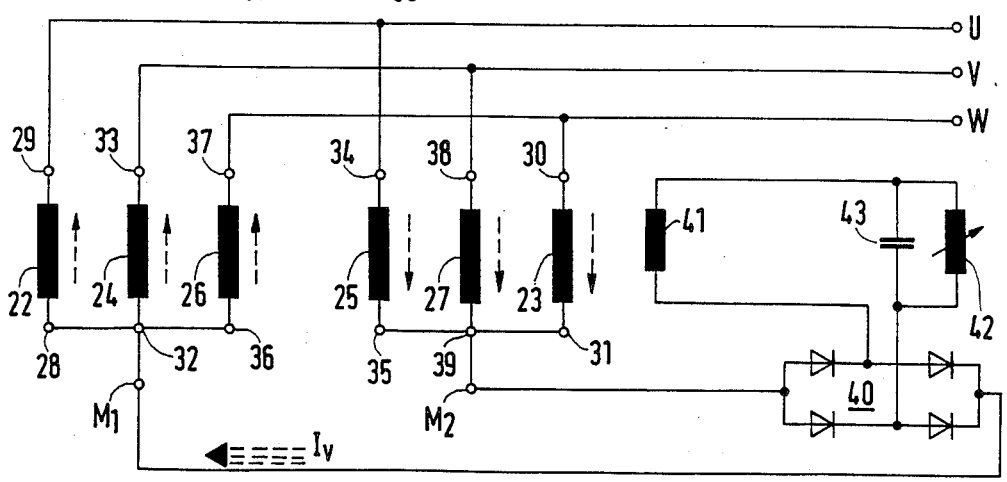
FIG. 7 is a schematic illustration of the basic circuit of FIG. 6.

According to FIG. 6 the ring winding consists of 6 identical winding elements 22 to 27 which are offset relative to each other at the stator circumference by 60° each and which are combined according to FIG. 7 to form two three-phase, Y-connected winding groups of which the in-phase outer winding ends 29, 34; 33, 38 and 30, 37, respectively, are connected directly and are brought to the output terminals U, V and W. The pre-magnetizing d-c current $I_V$ is fed-in via the neutral points M1 and M2, brought out separately, of the two winding groups. Each of the three winding legs consists of two parallel branches which are divided over the two winding groups and are arranged at the stator, offset by one pole pitch, as can be seen from FIG. 6. The two neutral points M1 and M2 therefore have the same potential with respect to the voltages induced in the two identical winding groups by the permanent magnets 16 (FIGS. 4 and 5). The control circuit furnishing the pre-magnetizing d-c current $I_V$ therefore remains free of the induced a-c voltages and currents. Vice versa, the output terminals U, V and W have the same potential with respect to the d-c voltage impressed on the two Y-points M1 and M2, so that no parts of the pre-magnetizing d-c current $I_V$ can flow to the connected consumer (load rectifier 4 in FIGS. 2 and 3). The pre-magnetizing d-c current $I_V$ is divided in the windings into three branch currents, of which each flows through one of the three winding branch pairs 22, 25; 24, 27 and 26, 23, respectively. The direction of these branch currents is indicated by dashed arrows. Transferring these current connection arrows from FIG. 7 to FIG. 6, while maintaining their respective direction with respect to the winding ends shows that each winding section supplies magnetic excitation which pre-magnetizes the stator yoke in the same circumferential direction. With an increase of this excitation, i.e., with an increase of the pre-magnetizing d-c current $I_V$, the magnetic saturation of the stator yoke and thereby the magnetic resistance for the permanent magnet fluxes is also increased. These fluxes and the voltages induced by them are decreased accordingly. The pre-magnetizing d-c current $I_V$, therefore, causes a change in the opposite direction of the a-c voltage delivered at the output terminals U, V and W. The pre-magnetizing d-c current $I_V$ is given off, according to FIG. 7, from an auxiliary winding 41 arranged in the generator stator via a parallel resonant circuit consisting of a choke 42 and a capacitor 43, and a control rectifier 40. The auxiliary winding 41 can also be replaced by an insulating transformer which is connected on the primary side to the winding segments 22 to 27 or to part thereof, and to the secondary side of which the parallel resonant circuit 42, 43 is connected in series with the control rectifier 40. The parallel resonant circuit 42, 43 is designed so that its resonance frequency, at which it blocks the current, is equal to or only slightly higher than the frequency of the voltage induced in the auxiliary winding 41 at the upper speed $n_2$ (FIG. 1) but its resistance at the lower speed $n_1$ is only small. Accordingly, at the lower speed $n_1$ a pre-magnetizing d-c current $I_V$ which heavily saturates the stator yoke and thereby depresses the reduced a-c voltage accordingly, flows while at the upper speed $n_2$ the pre-magnetizing d-c current $I_V$ is attenuated by the blocking action of the parallel resonant circuit 42, 43 to such a degree that practically a complete desaturation of the stator yoke and thereby, the maximum of the induced a-c voltage occurs. So that the resonance frequency and thereby the operating speed range $n_1 \leq n \leq n_2$ can be adjusted, the choke 42 is designed with variable inductance.

In a ring winding with the operation explained above with $2p > 2$ poles, the arrangement of the 6 adjoining winding segments according to FIG. 6 extends only over two pole pitches and only the corresponding p segments of the p pole pairs form together, for instance, in series or in parallel, the individual winding branches according to FIG. 7.

Figure 8:
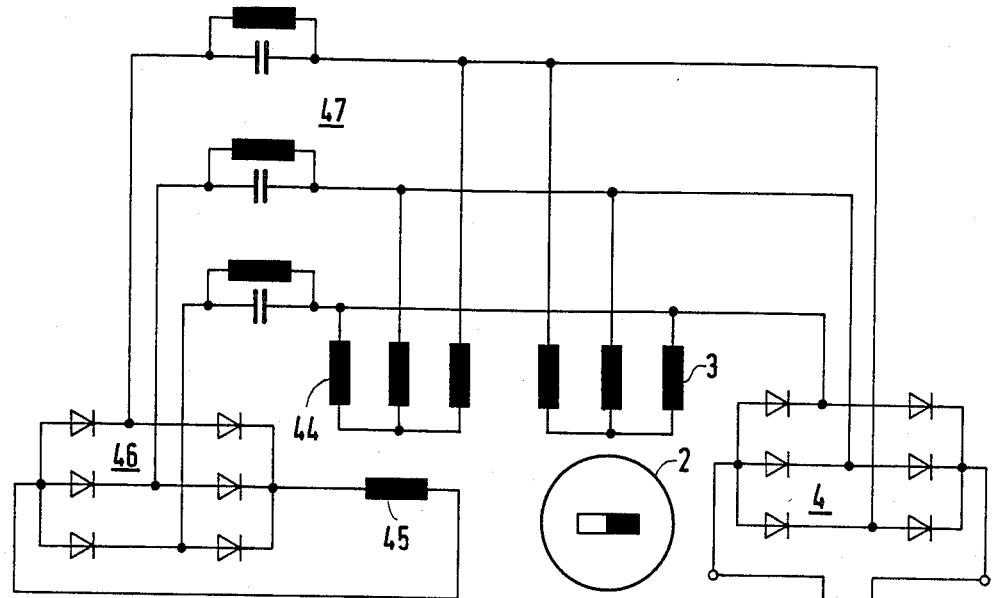
FIG. 8 illustrates a basic circuit of a synchronous generator which is excited by permanent magnets and feeds a d-c motor via a load rectifier, and a choke which weakens the field of the former and is pre-magnetized in dependence on the frequency.

FIG. 8 shows another arrangement for achieving a steep characteristic curve for the voltage of the permanent magnet excited synchronous generator 2 versus its speed. The induced winding of this machine feeds, in addition to the load rectifier 4 supplying the d-c motor 5, a choke 44, the inductance of which is variable through the pre-magnetization winding 45, through which d-c current flows. The premagnetization winding 45 obtains its current from a rectifier 46 which is connected via parallel resonant circuits 47 to the induction winding 3 of the synchronous generator 2. The resonance frequency of these parallel resonant circuits 47 is also equal here, or only slightly larger than the voltage frequency of the synchronous generator 2 corresponding to the upper operating speed $n_2$. Thus, the current of the premagnetization winding 45 is accordingly small at the upper speed $n_2$, so that the choke 44 is desaturated, i.e., its inductance is a maximum. The correspondingly small inductive loading of the synchronous generator 2 has no appreciable weakening influence on its permanent magnet field, i.e., the generator voltage reaches its maximum. On the other hand, the similarly designed parallel resonant circuits 47 have, at the frequency of the generator voltage corresponding to the lower operating speed $n_1$, so small a resistance that sufficient current flows through the pre-magnetization winding 35 to saturate the choke 44 heavily. Its inductance is then so small that the correspondingly large inductive load of the synchronous generator 2 decreases the permanent magnet field of the latter and thereby reduces the induced voltage considerably. The arrangement according to FIG. 8 has the advantage that any design of a permanent-excited machine is suitable for the synchronous generator 2.

Figure 9:
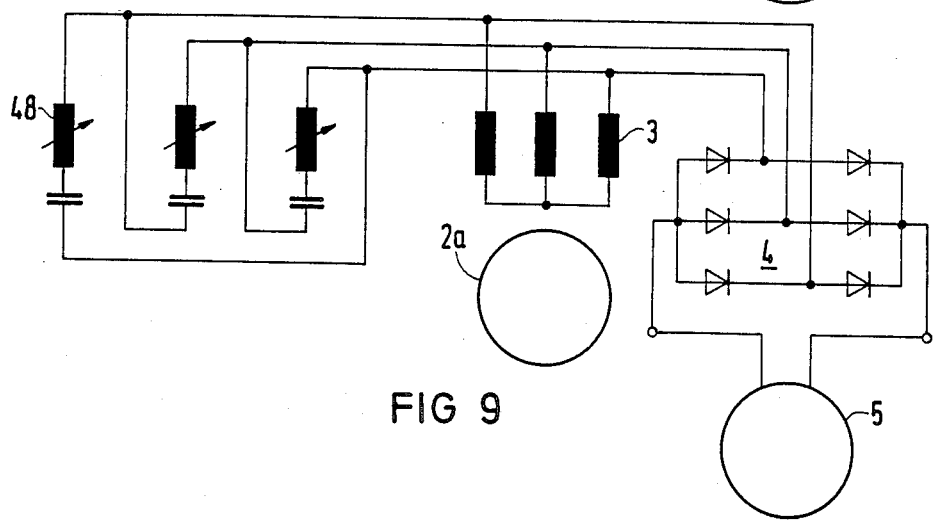
FIG. 9 illustrates the basic circuit of an asynchronous generator which feeds a d-c motor via a load rectifier and is self-excited by means of series resonant circuits.

Referring to FIG. 9 the generator feeding the d-c motor 5 via the load rectifier 4 can also be an asynchronous machine 2a with self-excitation by capacitive reactances, in the simplest case, only capacitors. Also here, the voltage curve versus the speed corresponds to FIG. 1. In order to narrow the operating speed range and to save capacitor capacity, the capacitive reactances can be formed by series resonant circuits 48 as shown in FIG. 9, the resonance frequency of which is just above the frequency of the generator voltage corresponding to the upper operating speed $n_2$. Contrary to excitation with capacitors alone, a certain amount of saturation of the asynchronous generator 2a is allowed in the upper voltage range and thereby, its utilization can be improved without expanding the operational speed range $n_1 \leq n \leq n_2$ detrimentally. If chokes with variable inductance are used for the series resonant circuits 48, the possibility of shifting the operational speed range of the asynchronous generator 2a and the turbine 1 exists.

For very high speeds it is advisable to either design the rotor of the asynchronous generator 2a as an external rotor with a squirrel-cage or to provide a solid interior rotor with or without short-circuit cage.

The series resonant circuits 10, 12, 13 and 48 in FIGS. 3 and 9 as well as the parallel resonant circuits 42, 43 and 47 in FIGS. 7 and 8 can also be replaced by known combinations, with the same effect, of several capacitors and/or chokes per resonant circuit, by which a steeper frequency curve of its reactance can be obtained than with the mentioned simple resonant circuits. Thereby, the speed or frequency dependence of the voltage of the generator 2 or 2a can be improved further.

For the d-c motor 5, machines with electronic commutation can be considered in addition to the customary machines with mechanical commutation. The former (electronic) commutation is suitable especially if very high motor speeds are provided by the coupling with the internal-combustion engine, but also to avoid unfavorable atmospheric influences on a commutator from case to case.

Since in series motors the voltage curve versus the speed is substantially flatter than in the case of shunt motors, the series motor is preferred for the design of the d-c motor 5 (FIG. 2) because thereby a smaller operational voltage range is obtained for the generators 2 or 2a. The d-c motor 5 can also be provided with external or permanent-magnet excitation. In this case, it is advisable to provide, in the upper speed range of the d-c motor, a weakening of its field in order to decrease the operational voltage range of the generator 2 or 2a.

What is claimed is:

1. In an arrangement for recovering lost power of an internal combustion engine, comprising a turbine the driving power of which comes from the power loss of the internal combustion engine and a generator with a winding, said generator coupled to the turbine, and a motor coupled to said winding, the motor drivingly coupled to the engine to relieve the load on the internal combustion engine, said generator being driven with a speed n which is between a minimum speed $n_1$ and a maximum speed $n_2$, the improvement comprising means to cause the voltage induced in the generator winding to increase steeply from a first value at speed $n_1$ to a second value at speed $n_2$ which is many times the first value, without a separate control device.

2. An arrangement according to claim 1, wherein the generator is a self excited machine unstable as to its speed.

3. An arrangement according to claim 2, wherein the stator of the generator is constructed such as to be magnetically unsaturated in the operating speed range, $n_1 \leq n \leq n_2$.

4. Arrangement according to claim 2, the generator further including an excitation winding connected to the d-c output of an excitation rectifier, the excitation rectifier having an a-c input provided by an a-c circuit having reactances.

5. An arrangement according to claim 1, wherein the generator is a permanent magnet excited machine.

6. An arrangement according to claim 5, wherein the generator has an external rotor containing permanent magnets.

7. An arrangement according to claim 5, and further including d-c excited means for premagnetizing part of the flux path of the permanent magnet machine for controlling the useful permanent magnet flux of the generator by saturation.

8. An arrangement according to claim 7, wherein said means for premagnetizing comprise a d-c fed ring winding to cause pre-magnetization of the stator yoke.

9. An arrangement according to claim 8, wherein said generator is an a-c generator and said ring winding also forms at least part of the winding generating an a-c voltage.

10. An arrangement according to claim 7, including a control rectifier and means feeding said rectifier with a voltage of frequency proportional to the speed of the machine, via at least one parallel resonant circuit, the current-blocking resonance frequency of which is not exceeded operationally, said rectifier supplying the current causing the premagnetization of the stator yoke.

11. An arrangement according to claim 1, wherein the generator is a reluctance machine with a windingless rotor.

12. An arrangement according to claim 5, wherein the generator is an a-c generator and including a load rectifier supplying the d-c motor fed by said generator and further including a d-c pre-magnetized choke having a pre-magnetization winding, a rectifier, and at least one parallel resonant circuit, the resonance frequency of which is not exceeded in operation, the output of said generator winding coupled through said resonant circuit and rectifier to said pre-magnetization winding.

13. An arrangement according to claim 1, wherein the generator is an asynchronous machine excited by reactances of capacitive effect.

14. An arrangement according to claim 13, wherein the capacitive reactances comprise series resonant circuits, the resonance frequency of which is above the operational frequency range.

15. An arrangement according to claim 14, wherein the asynchronous generator comprises an external rotor with a short-circuit cage.

16. An arrangement according to claim 14, wherein said asynchronous generator comprises a solid rotor.

17. An arrangement according to claim 1, wherein the d-c motor relieving the internal combustion engine is a series machine.

18. An arrangement according to claim 1, wherein the d-c motor relieving the internal combustion engine is a machine with permanent magnets or external excitation.

19. An arrangement according to claim 1, wherein the generator is a permanent magnet excited d-c machine.

20. An arrangement according to claim 16, wherein said rotor is windingless.

21. An arrangement according to claim 16, wherein said rotor is provided only with a short-circuit cage.

22. An arrangement according to claim 1, wherein the d-c motor relieving the internal combustion engine is an electrically commutated series machine.

23. An arrangement according to claim 1, wherein the generator is a self-contained excited machine unstable as to its speed.

24. An arrangement according to claim 1, wherein the generator is a permanent magnet excited synchronous machine.

25. In an arrangement for recovering lost power of an internal combustion engine, comprising a turbine the driving power of which comes from the power loss of the internal combustion engine and a generator with a winding, said generator coupled to the turbine, and a motor coupled to said winding, the motor drivingly coupled to the engine to relieve the load on the internal combustion engine, said generator being driven with a speed n which is between a minimum speed $n_1$ and a maximum speed $n_2$, the improvement comprising means to cause the voltage induced in the generator winding to increase steeply from a first value at speed $n_1$ to a second value at speed $n_2$ which is many times the first value, without a separate control device, the generator having a narrow speed range, $n_1 \leq n \leq n_2$, the minimum speed $n_1$ being defined at the onset of self-excitation and the maximum speed $n_2$ being defined at the beginning of magnetic saturation.

* * * * *